UNITED STATES PATENT OFFICE 2,114,122

ALCOHOLS AND PROCESS FOR MAKING SAME

Herman A. Bruson, Elkins Park, Pa., assignor to Röhm & Haas Company, Philadelphia, Pa.

No Drawing. Application January 15, 1935, Serial No. 1,895

14 Claims. (Cl. 260—127)

This invention relates to new phenolic aralkyl-amino alcohols, more particularly to alcohols having the probable general formula HO—R—CH$_2$—N(X)—alkylol where R is an aromatic or substituted aromatic nucleus, and X is hydrogen, methylol, or an alkylol amino methylene group. It also relates to the process for the preparation of these compounds.

HO—R+2CH$_2$O+H$_2$N—CH$_2$—CH$_2$OH ⟶ HO—R—CH$_2$—N$\diagup^{\text{CH}_2\text{OH}}_{\diagdown\text{CH}_2—\text{CH}_2\text{OH}}$   (III)

HO—R+2CH$_2$O+2H$_2$N—CH$_2$—CH$_2$OH ⟶ HO—R—CH$_2$—N$\diagup^{\text{CH}_2—\text{NH}—\text{CH}_2\text{CH}_2\text{OH}}_{\diagdown\text{CH}_2—\text{CH}_2\text{OH}}$   (IV)

These substances are obtained according to the present invention by condensing any phenol having a replaceable nuclear hydrogen atom, and which is free from interfering groups, with at least one molecular equivalent each of formaldehyde and an aliphatic or cyclo-aliphatic amino-alcohol having a primary amino group, more particularly aliphatic amino-alcohols of the series H$_2$N—C$_n$H$_{2n}$—OH where $n$ is an integer greater than one; and including also aliphatic or cyclo-aliphatic amino-polyhydric alcohols having a primary NH$_2$—group.

The condensation takes place at ordinary temperatures (20–30° C.) upon simply mixing the three components together in any order, suitably in an inert organic solvent such as alcohol or dioxane. The reaction can be accelerated by heating for a short time at about 60–100° C.

Several competing reactions take place which may be formulated as follows, using for purposes of illustration a phenol R—OH, formaldehyde, and beta-amino-ethanol:

CH$_2$O+H$_2$N—CH$_2$—CH$_2$OH→
        HO—CH$_2$—NH—CH$_2$—CH$_2$OH   (I)

HO—R+HO—CH$_2$—NH—CH$_2$—CH$_2$OH→
        HO—R—CH$_2$—NH—CH$_2$—CH$_2$OH   (II)

The formaldehyde and amino alcohol first combine with evolution of heat to form a methylol derivative (I), which then reacts with a mol. of the phenol to form the hydroxyaralkyl-amino-alcohol (II). This product is often the main product of the reaction, especially if care is taken to use only one molecular equivalent each of the three components, and to prevent a rise in temperature much above 30° at least at the start of the reaction.

In many cases this product (II) can be isolated as a well-defined crystalline substance. However, side reactions also occur, especially if an excess of formaldehyde or of amino alcohol is employed; so that a complex mixture of phenolic amino-alcohols is usually obtained among which may be the following:

These can, of course, again react with formaldehyde or with formaldehyde plus beta-aminoethanol, and this can be kept up indefinitely. In this manner chain molecules can be built up until all free molecular movement ceases and the end product becomes a rigid solid. The final product thus obtained is a nitrogenous resinoid containing a multiplicity of meth-amino-alcohol groups chemically bound to one or more phenolic nuclei. The reaction may be interrupted at any stage.

All of the above bodies are new compounds having valuable properties. In the early stages of condensation they are usually oils or sticky viscous sirups. Some of these crystallize on standing to form the hydroxy-aralkylamino alcohols (II) already mentioned, or go over to amorphous solids. They all show the characteristic properties of a phenol, an alcohol, and an amine. For example, they either dissolve in an aqueous solution of sodium hydroxide or combine therewith to form a phenate. By virtue of their alcohol groups they may be esterified with monobasic or polybasic acids, or with acyl halides or acid anhydrides. Also by the action of concentrated sulfuric acid the sulfuric acid esters may be prepared, the salts of which are good wetting, cleansing and emulsifying agents.

The presence of an amino group is shown by the fact that they form amine salts with inorganic or organic acids. Many of these salts particularly the phosphoric, lactic, acetic or gluconic acid salts are readily soluble in water. Such aqueous solutions possess antiseptic or germicidal properties. If the phenols used contain long alkyl chains or large hydrocarbon radicals in the aromatic nucleus, such aqueous solutions of the amine salts possess very low surface tensions and give heavy foams when shaken. They find use as wetting, emulsifying, dispersing, and cleansing agents. Phenols such as butylphenol, amylphenol, hexylphenol, octylphenol, amylcresol, laurylphenol, cetylphenol, cyclohexylphenol, phenylphenol, or benzylphenol when thus condensed with formaldehyde and beta-aminoethanol for example, give products of this type.

On the other hand, many of the amine salts formed from these phenolic amino alcohol bodies and water-insoluble acids, particularly the higher fatty acids or the naphthenic or resin acids such as oleic, lauric, stearic, linoleic, palmitic, ricinoleic, or abietic, are readily soluble in hydrocarbons or in fatty oils such as the drying, non-drying, or semi-drying fatty oil glycerides. Such amine salts are therefore excellent emulsifying agents for oils, fats, and waxes since they are often also somewhat soluble in water and form foamy, soapy solutions. The salts formed from these phenolic amino alcohols and sulfonated oils or the sulfated higher alcohols such as lauryl or cetylsulfuric acid, are excellent soaps and wetting agents which possess high phenol coefficients due to the presence of the phenolic group.

All of the above bodies are convertible to nitrogenous resins when heated, especially if an excess of formaldehyde to introduce additional methylol groups is present. This applies not only to the phenolic amino alcohols themselves, but also to their esters, amides, and amine salts. Such products may therefore be employed in coating, laminating, and moulding compositions very much like the well-known resins of the bakelite class. They differ however, from all heretofore known heat reactive phenolic-formaldehyde resins in containing sufficient nitrogen chemically bound and so oriented, that their amine salts formed from lactic, phosphoric, or acetic acids for example, are water-soluble in the "A" stages, and swellable in water in the "B" stages, somewhat like gelatine. Such aqueous solutions of the amine salts can be used for impregnating porous substances such as paper, textiles, vegetable or animal fibres, and upon application of heat they can be converted to resinous salts. If the acids used are volatile such as acetic or formic acid, they are expelled when the amine salt is heated above 100° C. and the phenolic amino resinoid itself is formed. Such solutions are useful for crease-proofing fabrics.

The amine salts of the higher fatty acids may be dissolved in volatile aromatic aliphatic or hydroaromatic hydrocarbons or in fatty glycerides and used directly as coating or impregnating compositions.

It is thus apparent that the compounds described herein differ greatly from the already known phenolic-formaldehyde resins which are of course, insoluble in aqueous solutions of acids and incapable of forming salts with acids. Even when carried to the infusible, insoluble "C" stage, the resinoids obtained from the herein described phenolic amino alcohols, still retain all of their nitrogen as supplied originally in chemically combined form. They therefore differ physically and chemically from all hitherto known phenolic-formaldehyde resins such as for example, may be prepared according to the known art by the use of catalytically small amounts of basic condensing agents such as ammonia or mono-, di-, or tri-ethanol amine, which resins are insoluble in acids and contain only traces of chemically bound nitrogen and do not form amine salts.

By varying the nature of the phenol used, hydroxy-aralkyl-amino alcohols suitable for various other purposes can be obtained. For example, the nuclear chlorinated phenols give products which alone, or in the form of their salts, are mothicides or powerful anticeptics.

Those of the phenolic amino alcohol products set forth herein, which contain a secondary nitrogen group, i. e., where X is hydrogen, react readily with a mol. equivalent of an acyl halide to form the corresponding amide.

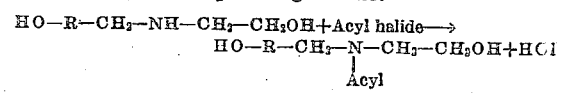

Such amides are useful intermediates for the preparation of soaps, wetting, or emulsifying agents by sulfonation of the alcoholic hydroxyl group or the aromatic nucleus R, especially if the acyl group is a long fatty chain containing six or more carbon atoms such as caproyl, oleyl, stearyl, palmityl, and the like. In case the product contains a tertiary nitrogen atom such as is shown by Formulas (III) and (IV), corresponding quaternary ammonium bases can be made by treatment with an alkylating agent in the usual manner such as for instance, benzyl chloride, dimethyl sulfate, diethyl sulfate, etc.

Other uses to which the hydroxy-aralkylamino-alcohols set forth herein or their salts, esters, and amides may be put are as antioxidants in oils or rubber, as pickling inhibitors, insecticides, metal-cleaning compositions, and in dyeing, tanning or mordanting operations.

In practicing this invention, any phenol or phenolic substance having a nuclear hydrogen atom readily available for replacement, preferably but not necessarily, ortho to the phenolic hydroxyl group, may be used for the condensation provided it is free from interfering groups such as acidic groups which can themselves react with the amino group of the alcohol employed. The reaction can be carried out with monohydric or polyhydric phenols which may be mononuclear or polynuclear in structure, and which may contain as additional nuclear substituents halogen, acyl, hydroxyl, nitro, amino, alkoxy, alkylol, or hydrocarbon groups, such as alkyl, aryl, aralkyl, hydroaromatic or alicyclic hydrocarbon radicals.

Among typical phenols which I have used, the following are the more important:

Phenol, o-, m-, or p-cresol, 1,3,5-xylenol, p-terbutyl-phenol, p-sec-butylphenol, thymol, p-teramylphenol, o-, m-, or p-phenylphenol, o-, or p-cyclohexylphenol, p-benzylphenol, α, α, γ, γ-tetramethylbutyl-phenol, α, α, γ, γ-tetramethylbutyl-o-chlorophenol, beta-naphthol, resorcinol, guaiacol, hydroquinone, pyrocatechol, o-, m-, or p-chlorphenol, o-, m-, or p-nitrophenol, p-aminophenol, saligenin, 8-hydroxyquinoline, p-benzoylphenol, bis-(p-hydroxyphenyl)-dimethylmethane, p, p'-dihydroxydiphenyl, 2- or 4-chloro-o-phenylphenol, ortho-chloro-p-nitrophenol.

In lieu of the above phenols, the fusible, soluble so-called "A" stage resinous condensation products of formaldehyde and phenols or cresols which are soluble in dilute alkali hydroxide solutions as made with acidic, alkaline or neutral catalysts, according to known methods, can be used. In this case group R is of course a highly condensed phenolic radical to begin with.

The amino alcohols which are used for the purpose of this invention are those of the aliphatic or alicyclic series having a primary NH$_2$-group and one or more alcoholic hydroxyl groups.

Typical amino alcohols which can be used are beta-amino-ethanol, γ-amino-propanol, amino-isopropanol, aminobutanol, amino-ter-butanol, 1,2-amino-cyclohexanol, 3-amino-1,2-dihydroxy-propane and their homologues. For practical purposes, in view of availability and low cost, beta-amino-ethanol was used in the examples which follow, and it is understood that the beta-amino-ethanol used may be replaced mol. for mol. with any other of the amino-alcohols of the kind described herein, to yield substances of analogous character.

*Example 1.—2-hydroxy-3-phenyl-benzylamino-ethanol*

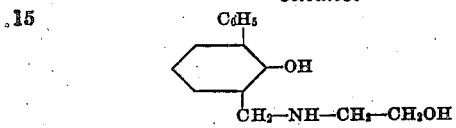

(a) To a solution consisting of 51 grams ortho-phenylphenol, 50 cc. methanol, and 30 grams aqueous 30% formaldehyde solution, there was added while cooling and stirring, 18.3 grams of pure beta-amino-ethanol. A clear reddish solution was obtained. Upon allowing this solution to stand 3 days at 25° C. or upon heating the solution on a steam bath under a reflux condenser for 2 hours, and chilling the resulting solution to 0° C. a waxy crystalline mass separated. (Yield 39 grams). It was purified by recrystallization from alcohol and formed colorless needles melting at 116° C.

Analysis

|  | Calculated for $C_{15}H_{17}O_2N$ | Found |
|---|---|---|
|  | Percent | Percent |
| C | 74.03 | 73.42 |
| H | 7.00 | 6.89 |
| N | 5.76 | 5.51 |

The product is insoluble in water but dissolves readily in ether or acetone. It is soluble in warm alcohol, benzene or petroleum ether and crystallizes out on cooling.

It combines with phosphoric or lactic acid to form water-soluble amine salts. With oleic acid it gives an oleate which is readily soluble in solvent naphtha.

(b) Sixty grams aqueous 30% formaldehyde solution (0.6 mol.) were added while cooling and stirring to 36.6 grams beta-amino-ethanol (0.6 mol.). When the odor of formaldehyde had disappeared and the formation of N-methylol-amino-ethanol (I) was complete, as is the case after 2 hours standing, the solution obtained was added to a solution of 102 grams ortho-phenyl-phenol in 100 cc. ethyl alcohol. The clear solution was allowed to stand 70 hours at 25° C. during which time two layers formed. The lower oily layer was run off and allowed to stand. It solidified to a solid crystalline mass weighing 60 grams. Upon recrystallization from methanol it melted at 116° C. and was identical with the compound in (a) above.

(c) In both cases described above, the oily material associated with the crystals contains some of the N-methylol derivative (III).

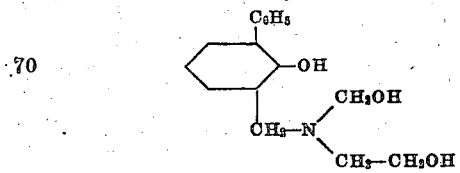

which can be also obtained by mixing the 2-hydroxy-3-phenyl-benzylamino-ethanol with one mol. equivalent of formaldehyde (in the form of an aqueous 30% solution) in a little alcohol and warming for several minutes at 50–60° C.

It forms a non-crystallizable sticky sirup, which when heated at 100–125° C. forms a hard, transparent nitrogenous resin. The same product is formed upon condensing o-phenylphenol with 2 mol. equivalents of formaldehyde and 1 mol. equivalent of beta-amino-ethanol.

(d) Upon mixing the 2-hydroxy-3-phenyl-benzylamino ethanol with 1 mol. equivalent each of formaldehyde and beta-amino-ethanol or with 1 mol. equivalent of N-methylol-amino-ethanol, in alcohol, there is formed on warming to 45° C. a sticky, viscous oil consisting of

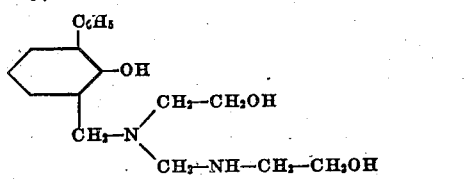

This product in turn can be resinified on warming to a nitrogenous resinoid. It may also be obtained by condensing o-phenylphenol with 2 mol. equivalents each of formaldehyde and beta-amino-ethanol.

*Example 2.—2-hydroxy-5-ter-amyl-benzyl-amino-ethanol*

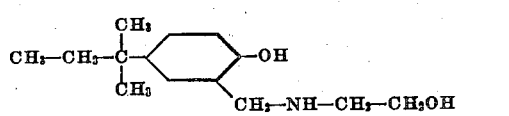

A solution consisting of 49.2 grams pure para-tertiary-amylphenol, 50 cc. methanol, and 30 grams aqueous 30% formaldehyde solution was mixed with 18.3 grams pure beta-amino-ethanol while cooling, and the mixture heated 2 hours under a reflux condenser on a steam bath. Upon cooling, two layers formed. The lower oil layer was separated and allowed to stand at 0° C. for several days during which time it partially crystallized. Upon recrystallization from methanol by chilling the solution, colorless platelets melting at 114° C. were obtained.

Analysis

|  | Calculated for $C_{14}H_{23}O_2N$ | Found |
|---|---|---|
|  | Percent | Percent |
| C | 70.83 | 70.54 |
| H | 9.77 | 9.44 |
| N | 5.90 | 5.72 |

The product is soluble in acetone, benzene, ether, or alcohol, but is insoluble in water.

It dissolves in aqueous 10% solutions of oxalic or phosphoric acid to give soapy, foamy solutions of low surface tension. Its salts with stearic, palmitic, or oleic acid are soluble in linseed oil.

When heated with one mol. equivalent aqueous formaldehyde it is converted to the N-methylol derivative which is a non-crystallizable sirup. Further heating converts the latter to a nitrogenous hard resin.

*Example 3.—2-hydroxy-5-ter-butyl-benzyl-amino-ethanol*

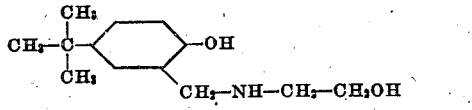

To a solution of 15 grams para-tertiary-butylphenol, 15 cc. methanol and 10 grams aqueous 30% formaldehyde solution, there was added dropwise while cooling to below 40° C. and stirring, 6.1 grams pure beta-amino-ethanol. The mixture was allowed to stand at 25° C. for 72 hours, during which time two layers formed. The lower oily layer was run off and set aside at 0° C. to crystallize. The crystals were purified by repeated solution in methanol and chilling to 0° C. The product formed colorless platelets melting at 128° C.

It dissolved in aqueous 35% sulfuric acid solution to give a clear foamy, soapy solution. Its lactic acid and phosphoric acid salts are also water-soluble. The free base itself is insoluble in water.

*Example 4.—2-hydroxy-5-cyclohexyl-benzylamino-ethanol*

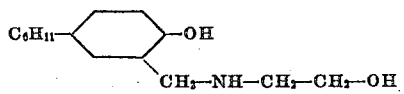

A mixture of 32.8 grams para-cyclohexylphenol, 32 cc. methanol, 20 grams aqueous 30% formaldehyde solution, and 12.2 grams beta-amino-ethanol was heated under reflux on steam bath for 1½ hours. On cooling, two layers formed, the lower of which was an oil. It slowly crystallizes on long standing to colorless crystals which upon recrystallization from alcohol melted at 160–162° C.

*Example 5.—2-hydroxy-5-nitro-benzylamino-ethanol*

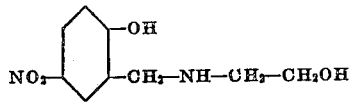

Para-nitro-phenol dissolved in its own weight of methanol was mixed with one molecular equivalent each of formaldehyde (as an aqueous 30% solution) and beta-amino-ethanol. After standing one week at 25° C. the clear solution was heated 1½ hours under reflux on a steam bath. On cooling, a yellow crystalline mass separated. Upon recrystallization from alcohol it formed fine golden yellow needles melting at 196° C.

Analysis

|   | Calculated for $C_9H_{12}O_4N_2$ | Found |
| --- | --- | --- |
|   | Percent | Percent |
| C | 50.91 | 50.81 |
| H | 5.70 | 5.77 |
| N | 13.20 | 12.56 |

It is insoluble in water. Its hydrochloride, sulfate, oxalate, phosphate, and lactate are however, readily soluble in water.

*Example 6*

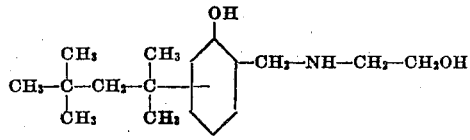

A solution of 41.2 grams alpha, alpha, gamma, gamma, tetramethylbutylphenol (0.2 mol.) in 40 cc. methanol was mixed with a solution of 20 grams aqueous 30% formaldehyde solution (0.2 mol.) and 12.2 grams beta-amino-ethanol (0.2 mol.). The solution was heated on a steam bath under reflux for 2 hours. Upon standing, two layers formed. The lower layer was a pale yellow oil. It was washed repeatedly with water, in ether solution. Upon evaporation of the ether in vacuo, a pale yellow sirup was obtained which could not be crystallized. It was readily soluble in phosphoric acid or lactic acid to give a clear liquid which when diluted with water produces a foamy, soapy solution.

*Example 7.*—To a solution of 22 grams resorcinol (0.2 mol.) in 75 cc. alcohol there was added a previously prepared solution of 20 grams aqueous 30% formaldehyde solution (0.2 mol.) and 12.2 grams beta-amino-ethanol. A clear solution was obtained which soon became warm and began to deposit a grayish solid. After standing for 24 hours in a stoppered flask, the mixture was treated with an equal volume of alcohol and the white powder which separated was filtered off and washed thoroughly with alcohol. It formed an amorphous powder which upon standing tends to turn red. It is insoluble in water. Only traces dissolve in hot alcohol. It is however, readily soluble in aqueous 10% solutions of phosphoric, oxalic, or acetic acid with which it combines to give water-soluble amine salts.

When heated the powder decomposes above 200° C. without melting.

Hydroquinone when treated in the same manner gives a water-soluble resin.

*Example 8.—2-hydroxy-5-benzoyl-benzylamino-ethanol*

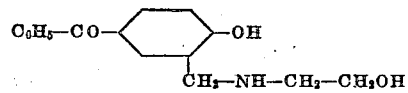

To a mixture of 19.8 grams para-benzoylphenol (0.1 mol.) and 25 cc. methanol, there was added a solution prepared by mixing 10 grams aqueous 30% formaldehyde solution (0.1 mol.) with 6.1 grams beta-amino-ethanol. After standing 2 hours at 25° C. the mixture was heated on steam bath under reflux for 1½ hours. On cooling, a crystalline sediment separated. Upon recrystallization from alcohol, the product formed pale cream-colored crystals melting at 189° C. It dissolves readily in aqueous 10% solutions of oxalic or lactic acid to give the corresponding amine salts which are readily soluble in water.

*Example 9*

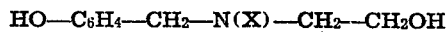

(a) 122 grams of beta-amino ethanol (2 mols) were mixed with 200 grams of aqueous 30% formaldehyde solution (2 mols HCHO) which was added dropwise while stirring and cooling so that the temperature did not exceed 40° C. After standing several hours at room temperature (25° C.), the formation of N-hydroxymethylamino-ethanol was complete, and the odor of formaldehyde had completely disappeared. The clear, colorless solution thus obtained, was added to 188 grams phenol (2 mols) while stirring. The mixture was allowed to stand for 24 hours at 20–25° C. A clear reddish solution was obtained which when poured into water separated as an oil. The oil was washed several times with water and allowed to dry in a flat dish in a desiccator. It formed a honey-like, pale, reddish, transparent oil which was readily and completely soluble in aqueous 10% solutions of phosphoric, lactic, acetic, acrylic, oxalic, sulfuric, hydrochloric, tartaric, crotonic, citric, gluconic or maleic acids. It was soluble in alcohol, acetone, or in aqueous 10% caustic soda solution, but was insoluble in aqueous 10% sodium carbonate solution or in benzene.

With higher fatty acids such as oleic, ricinoleic, linseed oil fatty acids, cocoanut oil fatty acids, elaeostearic acid, naphthenic acid, stearic acid or palmitic acid it combined to form amine soaps, which were readily soluble in aromatic, hydroaromatic, or petroleum hydrocarbons as well as in animal or vegetable fatty glycerides of the drying oil, semi-drying oil, or non-drying oil type.

When heated at 100–150° C. for some time the oil itself as well as its amine salts tends to form resins. The acetic acid salt for example, readily loses acetic acid at 110° C. and goes over to a hard, brittle, nitrogenous resin which eventually becomes insoluble and infusible. The acetic acid salt can thus be employed in aqueous solution for impregnating porous materials such as paper, cloth, fibres, cellulose, leather and the like, and upon the application of heat will go over into a resinoid. The same applies to the other water-soluble salts. The oleate, linoleate, eleaostearate, naphthenate, or other hydrocarbon-soluble amine salt of the hydroxy-benzyl-aminoethanol can be dissolved in petroleum naphtha and mixed with baking oleo-resinous varnishes, alkyd resins, and the like, or used itself as a coating composition, which when baked gives a dry, hard film.

(b) If a faster curing resin is desired, i. e., one which will transform to the resinoid stage more rapidly on the application of heat, it is desirable to use 200 grams additional aqueous 30% formaldehyde in the above procedure. The product separates as a viscous oil. After being washed with cold water it forms a water-insoluble oil which is more viscous than that obtained in (a) above, and which is so reactive that on washing with boiling water it rapidly goes over to a hard, brittle, pale yellow resin which is also readily soluble in the aqueous acids enumerated under (a) above, and also combines with the higher fatty acids mentioned to give hydrocarbon-soluble salts. When heated, the oil, the resin and their respective salts go over to nitrogenous resinoids.

*Example 10.*—To 94 grams phenol, (1 mol.), there is added a solution of 2 mol. equivalents N-hydroxy methylamino ethanol, prepared by mixing 200 grams of aqueous 30% formaldehyde (2 mols) at 15–25° C. with 122 grams beta-amino-ethanol and allowing the mixture to stand until the odor of formaldehyde has disappeared. After 24 hours standing at room temperature, the clear solution obtained is diluted with a large volume of cold water to precipitate the product as a viscous reddish oil. It is readily soluble in dilute caustic alkali solutions or in aqueous 10% solutions of oxalic, lactic, phosphoric, hydrochloric, hydrosilicofluoric, or sulfuric acid. Its oleate is a reddish oil which dissolves in water to give a soapy solution. The free base as well as its amine salts readily forms hard resins when heated.

*Example 11*

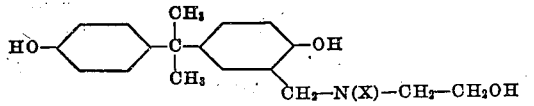

To a solution of 22.8 grams bis-(p-hydroxyphenyl)-dimethyl-methane (0.1 mol.) in 30 cc. alcohol and 20 grams aqueous 30% formaldehyde (0.2 mol.) there were added 6.5 grams beta-amino-ethanol (.106 mol.) while cooling. The solution was allowed to stand 24 hours at 25° C. and then poured into water. The oil which separated was taken up in ether, and the ether solution washed several times with water. Upon removal of the ether, a reddish, honey-like sirup was obtained. It was readily soluble in aqueous 10% phosphoric acid solution. When heated it rapidly formed a hard, brittle, nitrogenous resin.

The formaldehyde as well as the beta-amino ethanol can be increased so as to replace any or all of the three remaining ortho positions if desired.

*Example 12*

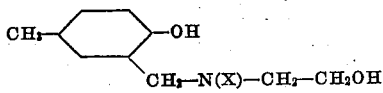

A mixture of 21.6 grams pure para-cresol (0.2 mol.) in 21 cc. methanol was mixed with a solution of 20 grams aqueous 30% formaldehyde and 12.2 grams beta-amino ethanol, and the solution heated on steam bath under reflux for 2 hours. On cooling, a clear, pale yellow solution was obtained which when poured into water, separated a pale yellow oil. It was readily soluble in dilute sulfuric or hydrochloric acid. Its oleic acid salt was readily soluble in fats and oils.

*Example 13.—2-hydroxy-3-(o-chlorophenyl)-benzylamino-ethanol*

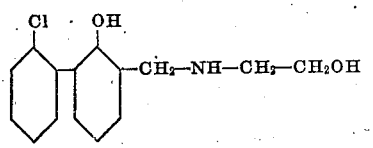

To a solution of 27.8 grams technical 2-chloro-o-phenylphenol in 27 cc. methanol, there were added 10 grams aqueous 30% formaldehyde solution, and then while cooling, 6.1 grams beta-amino-ethanol. The clear solution was heated under reflux on a steam bath for 1½ hours. On cooling to about 45° C. two layers separated, the lower of which was run off and allowed to crystallize. It solidified in a few hours to a colorless solid mass of crystals. Upon recrystallization from ethyl alcohol, the product formed colorless fine needles melting at 124° C.

*Example 14.*—To a solution of 12.9 grams ortho-chloro-phenol and 20 grams aqueous 30% formaldehyde, there were added while cooling 6.1 grams beta-amino-ethanol. The mixture was allowed to stand 24 hours at 20–25° C. during which time two layers formed. The lower oily layer was separated and washed with lukewarm water. It formed a yellowish sirup which in contrast to the original ortho-chlorophenol, was readily soluble in aqueous 10% solutions of phosphoric or lactic acid.

*Example 15.—Amino-alcohol derivative of a phenolic-formaldehyde resin*

The resin used was obtained in a known manner by condensing 1 mol. of phenol with .70 mol.

of formaldehyde with concentrated hydrochloric acid as a catalyst. It represents a typical "Novolack" type of resin, i. e. it was fusible (melting point 67° C.) and soluble in alcohol, but was insoluble in dilute acids such as phosphoric acid.

5 grams of the above resin was dissolved in 10 cc. ethyl alcohol. To the solution were added 3 grams of aqueous 30% formaldehyde and 1.8 grams beta-amino-ethanol. The clear solution obtained was allowed to stand in a closed bottle for 4 days at 25° C. At the end of this time it was poured into 200 cc. of water. The product precipitated as a grayish white powder. After washing and drying it formed an amorphous powder, which dissolves readily in aqueous 10% solutions of phosphoric of lactic acid to give a clear foamy soapy solution.

*Example 16*

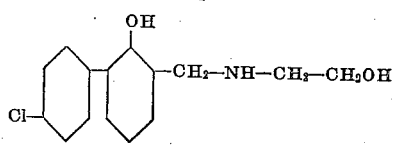

The above compound was obtained by using 4-chloro-o-phenylphenol, in Example 13, in place of 2-chloro-phenylphenol. The mixture solidified to a crystalline mass which is very difficultly soluble in alcohol. The product was recrystallized from boiling butyl alcohol in which it is sparingly soluble. It melted at 184° C.

The foregoing examples are given by way of illustration only. The invention is not limited to the exact materials, times, temperatures, etc., given in the examples, since it may be otherwise practiced within the scope of the following claims.

I claim:

1. A process for preparing phenolic aralkyl-amino-alcohols which comprises condensing a phenol having a reactive nuclear position available for replacement and which is free from acidic groups, with at least one molecular equivalent each of formaldehyde and beta-amino-ethanol.

2. A process which comprises condensing a phenol having a reactive nuclear position available for replacement and which is free from acidic groups, with at least one molecular equivalent each of formaldehyde and beta-amino-ethanol, and subsequently reacting upon the product with an acid.

3. A process for preparing phenolic amino alcohols having the structure

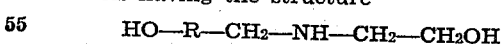

where R is an aromatic nucleus which comprises condensing one mol. equivalent each of formaldehyde and beta-amino-ethanol with 1 mol. equivalent of a phenol which is free from acidic groups and which contains a reactive replaceable nuclear position.

4. A condensation product of a phenol which is free from acidic groups with at least one molecular equivalent each of formaldehyde and beta-amino-ethanol.

5. A compound having the general formula

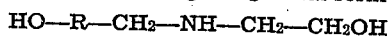

where R is an aromatic ring which is free from acidic groups.

6. 2-hydroxy-3-phenyl-benzylamino-ethanol,

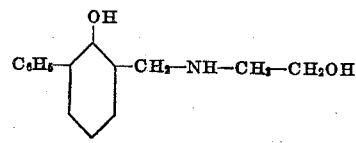

7. 2-hydroxy - 5 - tertiary-amyl - benzylamino-ethanol,

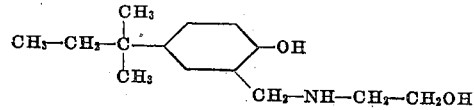

8. 2-hydroxy- 3 -(o-chlorophenyl)- benzylamino ethanol,

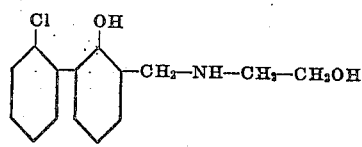

9. A process for preparing phenolic aralkyl-amino-alcohols which comprises condensing a phenol, having a reactive nuclear position available for replacement and which is free from acidic groups, with at least one molecular equivalent each of formaldehyde and an amino alcohol which is a member of the group consisting of lower aliphatic and alicyclic amino alcohols having a primary $NH_2$-group.

10. A process for preparing phenolic aralkyl-amino-alcohols which comprises condensing a phenol, having a reactive nuclear position available for replacement and which is free from acidic groups, with at least one molecular equivalent each of formaldehyde and an aliphatic amino alcohol of the formula $H_2N-C_nH_{2n}OH$ where $n$ has a value of two, three or four.

11. A process for preparing phenolic aralkyl-amino-alcohols which comprises condensing a phenol, having a reactive nuclear position available for replacement and which is free from acidic groups, with one molecular equivalent of an amino alcohol which is a member of the group consisting of lower aliphatic and alicyclic amino alcohols having a primary $NH_2$-group, and more than one molecular equivalent of formaldehyde.

12. A process for preparing phenolic aralkyl-amino-alcohols which comprises condensing a phenol, having a reactive nuclear position available for replacement and which is free from acidic groups, with more than one molecular equivalent each of formaldehyde and an amino alcohol which is a member of the group consisting of lower aliphatic and alicyclic amino alcohols having a primary $NH_2$-group.

13. A condensation product of a phenol which is free from acid groups with at least a molecular equivalent each of formaldehyde and an amino alcohol which is a member of the group consisting of lower aliphatic and alicyclic amino alcohols having a primary $NH_2$-group.

14. A condensation product of a phenol which is free from acidic groups with at least one molecular equivalent each of formaldehyde and a lower aliphatic amino alcohol having a primary $NH_2$-group.

HERMAN A. BRUSON.